(12) United States Patent
Heider

(10) Patent No.: US 6,259,357 B1
(45) Date of Patent: Jul. 10, 2001

(54) TRAILER HITCH POSITIONING APPARATUS

(76) Inventor: Joseph Heider, 539 I St., Sparks, NV (US) 89431

(*) Notice: Subject to any disclaimer, the term of this patent is extended or adjusted under 35 U.S.C. 154(b) by 0 days.

(21) Appl. No.: 09/476,709

(22) Filed: Dec. 30, 1999

(51) Int. Cl.$^7$ .................................................. G08B 21/00
(52) U.S. Cl. ........................ 340/431; 280/477; 280/504; 280/511
(58) Field of Search .................................... 340/431, 435, 340/425.5, 687, 691.6; 33/264; 280/477, 504, 511, 431, 438

(56) References Cited

U.S. PATENT DOCUMENTS

| 3,121,228 | 2/1964 | Kalmus | 340/931 |
|---|---|---|---|
| 3,418,628 | 12/1968 | Fenner | 340/431 |
| 3,605,088 | 9/1971 | Savelli | 340/431 |
| 3,771,325 | 11/1973 | Sweeney et al. | 340/431 |
| 3,790,276 | 2/1974 | Cook et al. | 340/431 |
| 3,825,921 | 7/1974 | Marus et al. | 340/431 |
| 3,924,257 | 12/1975 | Roberts | 340/431 |
| 3,947,839 | 3/1976 | Zigmant | 340/431 |
| 4,199,756 | 4/1980 | Dito | 340/431 |
| 4,552,376 | 11/1985 | Cofer | 340/431 |
| 4,852,901 | 8/1989 | Beasley et al. | 340/431 |
| 4,938,495 | 7/1990 | Beasley et al. | 340/431 |
| 4,972,917 | 11/1990 | Matsumoto et al. | 180/168 |
| 5,108,123 | 4/1992 | Rubenzik | 280/477 |
| 5,455,557 | 10/1995 | Noll et al. | 340/431 |
| 5,513,870 | * 5/1996 | Hickman | 280/477 |
| 5,650,764 | * 7/1997 | McCullough | 340/431 |
| 5,729,194 | 3/1998 | Spears et al. | 340/431 |
| 5,861,814 | 1/1999 | Clayton | 340/687 |
| 5,951,035 | * 9/1999 | Phillips, Jr. et al. | 280/477 |

* cited by examiner

Primary Examiner—Edward Lefkowitz
Assistant Examiner—Davetta Goins
(74) Attorney, Agent, or Firm—Harness, Dickey & Pierce, PLC

(57) ABSTRACT

A trailer hitch positioning apparatus is provided for directing the driver of a vehicle that is backing up to a trailer. The apparatus includes an infrared light and sensor unit mounted on the bumper or receiver of the towing vehicle for transmitting a light beam of predetermined vertical and horizontal width toward the trailer. A reflecting device mounted under the trailer tongue returns infrared light impulses with information back to the sensors which are analyzed by a microprocessor that controls a transmitter. The transmitter audibly guides the driver's ball to the trailer hitch for coupling. A stop tone warns the driver to stop when the ball and hitch are accurately positioned for coupling.

15 Claims, 2 Drawing Sheets

TRAILER HITCH POSITIONING APPARATUS

BACKGROUND OF THE INVENTION

1. Technical Field

This invention generally relates to a positioning apparatus for use during hitching a pickup truck or other towing vehicle to a trailer or other towed vehicle. More particularly, this invention relates to a positioning apparatus for aligning the coupling elements or the two vehicles as the towing vehicle is backed up or driven toward the towed vehicle and for indicating when the coupling elements are properly positioned for coupling.

2. Discussion

Hitching a vehicle to a trailer can be a long and frustrating process, especially when attempted by a single person. Because the coupling elements (i.e., ball and hitch) on the vehicle and trailer are normally not visible from the driver's seat, the driver must periodically stop the vehicle and inspect the alignment and position of the ball and hitch before moving the vehicle closer to the trailer. Even with frequent visual inspections, some misalignment of the ball and hitch normally results. A driver must then repeat the process or, if possible, manually shift the tongue and thus the hitch of the trailer over the ball so that the two vehicles can be hooked up. Complicating the maneuvering is the fact that a driver can become easily confused as to which direction to turn the front wheels in order to back the vehicle in the desired direction.

In an attempt to improve on this manual method, prior guidance systems have been designed for assisting a driver in maneuvering a vehicle toward a trailer. U.S. Pat. No. 4,938,495 to Beasley et al., for example, discloses a trailer hitch guide that uses an infrared light emitter mounted on a trailer and powered by a battery in the isolated unit. A support bar with alignment sensors is mounted on the back of a towing vehicle. The emitted infrared light produces a light field which can be detected by the receiving sensors on the vehicle. Beasley recites that depending on the orientation of the receiving sensors to the field, the alignment and position of the vehicle relative to the trailer can be determined from a direction indicator visible to the driver. The Beasley device, however, has a number of drawbacks. For example, the isolated light emitter mounted on the trailer runs on a battery in the unit and needs to be turned on before use and shut off after use. The same is true with the second sensor needed for the positioning of coupling. This leaves a great margin for human error as well as replacement and maintenance of the battery. Some vehicles may not have a support bar located in the rear bumper for mounting and this is cumbersome in design. Also, it is believed that the Beasley device may not always indicate accurately the relative position of the hitch and ball due to limitations of the Beasley approach.

Other exemplary prior devices for guiding the backing of a vehicle to a trailer are disclosed in U.S. Pat. No. 4,199,756 to Dito, and U.S. Pat. No. 3,418,628 to Fenner. These devices rely on mechanical contact switches or visual alignment mechanisms that are cumbersome and/or which must be mounted temporarily to a vehicle and trailer for use when attempting to back up and hitch the two together.

SUMMARY OF THE INVENTION

An object of the invention, therefore, is to provide an improved guiding apparatus for use in aligning and positioning a coupling element of a towing vehicle in hitching relation to a coupling element of a trailer or other towed vehicle.

A further object of the present invention is to provide a compact, easily installed, durable and reliable guiding apparatus with an audible indicator that indicates when the coupling elements of the vehicles are aligned and when their respective coupling elements are in position for coupling together.

Another object of the invention is to provide such an apparatus that indicates to the driver the direction in which to turn the steering wheel of the towing vehicle relative to the towed vehicle.

Still another object of the invention is to provide such an apparatus capable of detecting certain objects and people between the towed and towing vehicle thereby reducing the risk of accidents during use and enhancing the overall safety during use of the apparatus.

To achieve these objects, an apparatus in accordance with the present invention comprises an emitting means mounted under the ball on a towing vehicle for transmitting two focused optical beams toward a trailer or other towing utility vehicle. A reflecting means for receiving the two beams is mounted under the hitching tongue of the towed utility vehicle. The towing vehicle includes a plurality of sensors in predetermined locations relative to a towed coupling element, such as a hitch coupler for receiving pulsed infrared light information from the mounted reflector on the towed vehicle. These sensors discretely detect the presence of the first or second beam relative to the towing coupling element. When the ball coupler is in hitching relation to a towing coupling element, such as a trailer hitch on the tongue of the trailer, an alarm sounds. Further, an indicator is electrically coupled to the plurality of sensing means. The indicator comprises means for indicating alignment and misalignment of the truck ball and trailer hitch as the truck is backed up and also for indicating the direction in which the truck steering wheel should be turned to align these coupling elements in the event of any misalignment. In addition, the indicator comprises means for indicating when the coupling elements are in hitching relation.

In accordance with one specific aspect of the invention, the sensing means comprises at least three sensors in the rear of the towing vehicle under the ball or receiving coupler. In the illustrated embodiment, these three sensors are positioned along a line normal to the longitudinal vehicle axis. Also, the first and second optical beams are of a predetermined horizontal width and are centered about a vertical plane through the center of the ball and containing the longitudinal axis of the towing vehicle. In addition, the three sensors are directly under the ball or receiver coupling, spaced apart a distance slightly greater than the width of each focused beam. Therefore, the hitch and ball are aligned when the beams strike the third sensor spaced between the other two sensors.

In the illustrated embodiment, and as a more specific aspect of the present invention, the emitting means comprises two pulsed infrared light emitters for projecting infrared light to the reflecting means which reflects information back to the sensors as to the location of, and/or centering of, both light emitters.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
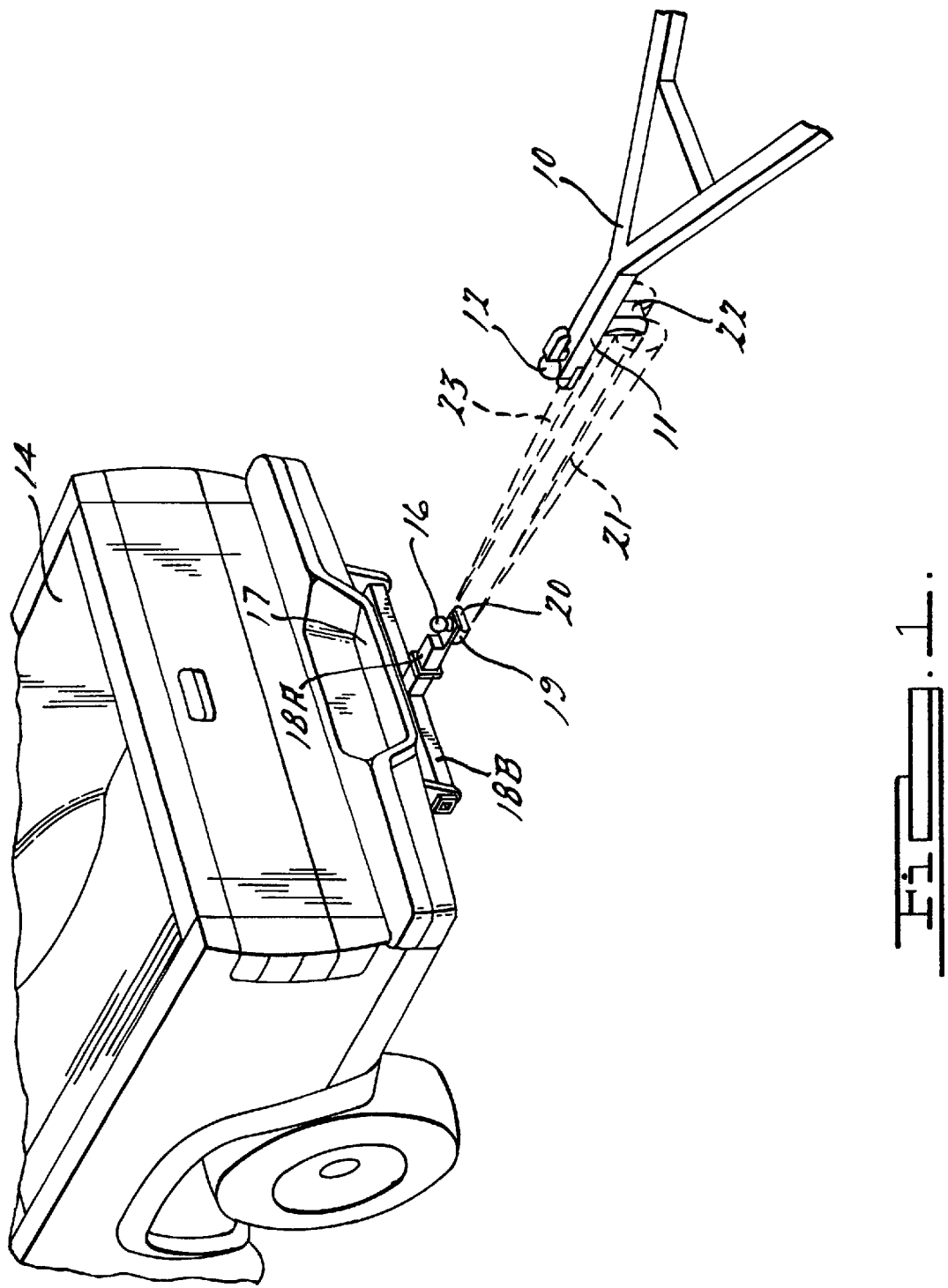
FIG. 1 is a perspective view of a trailer hitch positioning apparatus according to the invention with the towing and towed vehicles shown properly aligned.
Figure 2:
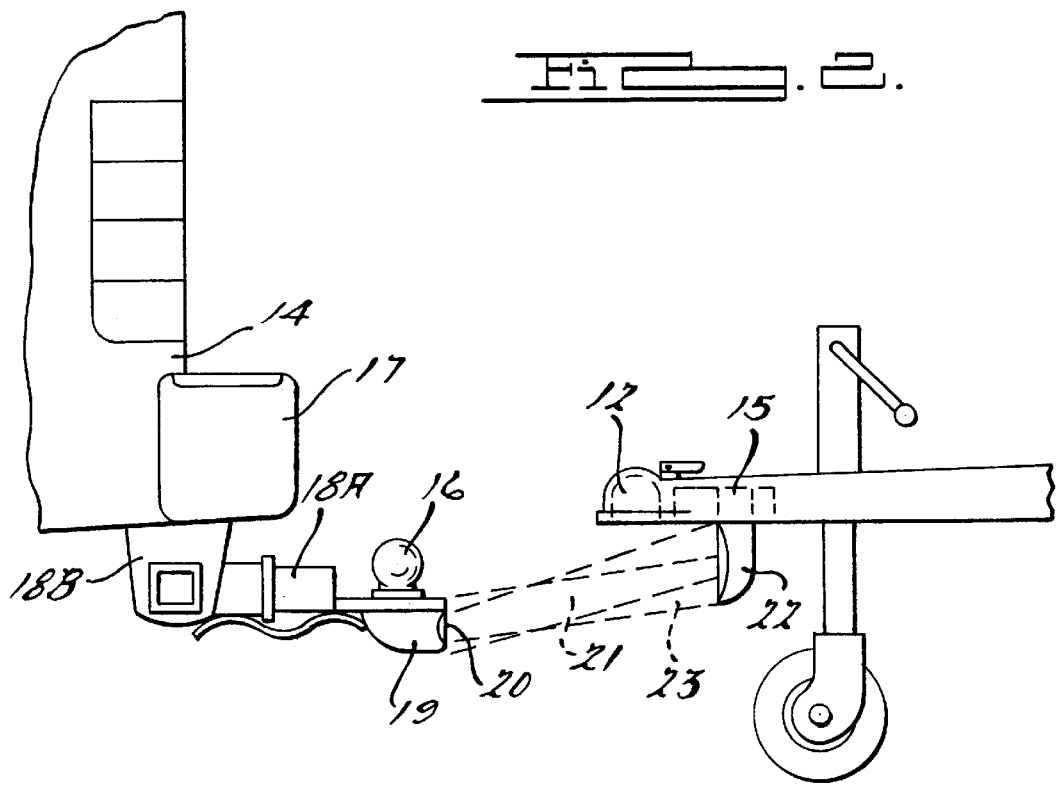
FIG. 2 is a side view of the apparatus of FIG. 1 showing the vehicles entering a position for being hitched together.

With reference to FIGS. 1 and 2 of the drawings, a portion of a trailer 10 or other towed vehicle is shown having an elongated tongue 11 which terminates in a towed coupling element such as hitch 12. A truck 14 or other towing vehicle is also shown with a towing coupling element such as a matching ball coupler 16 mounted on the rear bumper 17 or hitch receiver 18 mounted under towing vehicle 14. The ball coupler 16 and hitch 12 exemplify one type of conventional mechanism for coupling the trailer 10 and truck 14 together.

An emitting means 19 is mounted under the ball 16 on the bumper 17 or on towing hitch 18b of receiver tongue 18a. Infrared and sensor unit 20 emits optical beams 21 rearwardly from the truck 14 toward the trailer 10. This means comprises means for projecting a focused beam 21 to a reflecting means 22 from a location forward of hitch 12. In the illustrated embodiment, the emitting means comprises an infrared light transmitting unit 20 mounted, as by a magnet or fastener (not shown) to the receiver tongue 18a or bumper 17 for projecting the first and second focused beams with an infrared position emitter to reflector 22 on hitch tongue 11 for reflecting pulsed infrared information back to unit 20 powered by a lithium battery when mounted to the bumper 17. As can be seen in FIG. 1, the two beams are of a circular cross-section and have a circumference of horizontal width and vertical width that diverges as the beam projects and is expanding with distance. The light unit 20 produces this beam by projecting infrared light from plural emitters (described below) through commercially available infrared L.E.D. emitters which are positioned within emitter means 19. The light unit 20 is situated such that the first collimated beam is centered in a vertical plane containing the longitudinal trailer axis and bisecting the reflector 22 which transmits the second focused beam 23 back to sensor unit 20 beyond the front end of the hitch 12 and centered in this same vertical plane.

Figure 3:
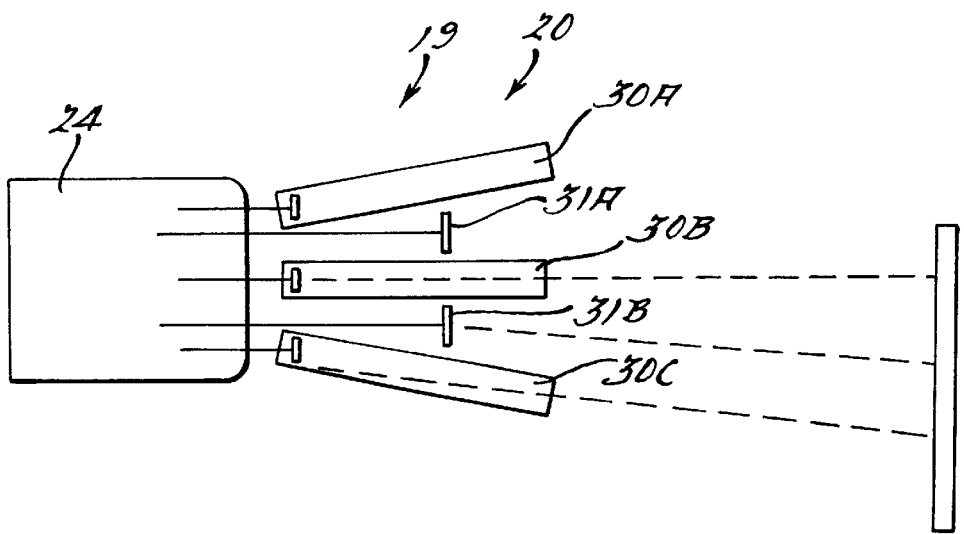
FIG. 3 is a schematic diagram of one form of a two optical beam emitter with three sensors used in the apparatus of FIG. 1.

Turning now also to FIG. 3 means 19 for receiving the beam from light unit 20 is mounted to the rear of the truck 14 and includes an enclosed unit which carries three infrared alignment sensors 30a, 30b, and 30c spaced apart laterally thereon and positioned under on or either side of the ball coupler 16. The sending and receiving unit 19/20 is mounted to the rear of the truck 14, preferably to the base of the bumper or ball bracket 17 or 18a, so as to be perpendicular to the longitudinal axis of the towed trailer 10. The alignment sensors 30a, 30b, 30c are typically laterally spaced equidistantly from the center of the ball coupler 16. More specifically, and for reasons explained more fully below, the sensors 30a, 30b, 30c are spaced apart a distance equal to the infrared beam and more preferably slightly greater than the width of the infrared beam. The respective sensors 30a and 30c represent right and left to the center of the ball coupler sensor 30b. In the present embodiment, the distance between sensors 30a and 30c is 2½ inches or smaller, with the predetermined width of the beam being about 2½ inches up to about 3 feet. The alignment sensor 30b, spaced between the two sensors 30a and 30c, is for detecting the presence of the reflected beam 23 between the other two sensors. The sensor 30b may be positioned in alignment with the towing vehicle axis and thus the center of ball coupler 16. Also, sensors 30a, 30b, and 30c are topically coated with a purple transparent film to provide better filtering of undesired fluorescent light from the environment. The use of the infrared signals minimizes interference from ambient light sources and also results in a highly accurate apparatus.

Means are also provided for detecting the positioning emitters 31a and 31b when the hitch 12 is over the ball coupler 16 in hitching relationship thereto. The sensor 30b is aligned with the center of the reflector that is in full spectrum of infrared light information of per calibrated hitching and coupling coordinates. The sensor 30b receives light from position reflector 22 when the hitch 12 is immediately above the ball coupler 16. Position reflector 22 and position sensor 30b may be at any other convenient location on the respective trailer and truck as long as the hitch is over the ball when the position sensor receives the desired light signal from the position emitter.

The outputs of the alignment sensors 30a, 30b, 30c are coupled via circuits, described below, to a transmitter 24 mounted within the unit 20. The transmitter 24 broadcasts RF signals to the vehicle's radio which emits corresponding tones. As best shown in FIG. 3, transmitter 24 is coupled to the position sensors 30a, 30b, and 30c. The transmitter 24 is engaged by the action of mounting it to the vehicle and a respective audible tone of right or left from center will indicate to the driver the position of steering needed to find center. Once a positioning sensor captures a reflection from reflector 22, the transmitter 24 changes emitted frequencies to indicate right or left to center by high and low pitch tones from the vehicle radio moving in unison from both high and low to center and indicates the truck 14 is aligned or "centered" with the trailer 10. Because of the spacing of sensors 30a, 30c and the width of the alignment beam 21, the desired alignment exists only when the light 23 on and the sensors 30a, 30b, 30c indicates that the beam is positioned between the two sensors 30a, 30c and that hitch 12 is centered on the ball coupler 16. A stop frequency is emitted from the transmitter 24 to indicate when the hitch 12 is immediately over the ball coupler 16. When the stop tone sounds, the trailer 10 and truck 14 are ready to be coupled together. The transmitter 24 also indicates if an object is between the trailer 10 and truck 14 by blocking the beam from reaching any of the sensors 30a, 30b, 30c. In this case, an interference frequency causes an interference tone to be emitted from the radio and the driver is alerted to stop the truck and check for obstructions.

The operation of the invention is best understood with reference to FIGS. 1 and 3. With the light unit 20 operational, two beams having predetermined circumferences are projected toward the trailer and bisecting the hitch 12. With the truck 14 and trailer 10 properly aligned, as shown in FIGS. 1 and 3, the reflected beam strikes the position between outer alignment sensors 30a, 30c such that the sensor 30b receives the light. Consequently, the sensor 30b generates a signal which is coupled via circuitry to the transmitter 24 which emits an RF signal causing the radio to sound the centering tone. The center tone indicates that the driver need only back up in a straight line toward the trailer 10. When the truck 14 is positioned relative to the trailer 10 as shown in FIG. 2, the focused beam from position reflector 22 strikes the position sensors 30a, 30b, 30c indicating that the hitch 12 is over the ball coupler 16. The sensor 30c then generates a signal to transmitter 24 which emits an RF signal causing the radio to sound the stop tone. The stop tone signals the driver to stop the truck 14.

If the truck 14 is approaching the trailer 10 from somewhat of an angle or is otherwise misaligned with the trailer, the reflected beam 23 strikes one or the other of the sensors 30a or 30c. The sensor 30a or 30c that receives light generates a signal which causes the corresponding RF signal to be emitted by the transmitter 24. The radio then sounds a tone having a pitch or rhythm that indicates which way the driver should turn the steering wheel to align the truck and trailer. For example, if the beam strikes the sensor 30c shown in FIG. 3, the truck 14 is laterally displaced to the right of the trailer 10 (looking from the trailer 10 towards the truck 14) and the turn left tone is sounded. The turn left tone, associated with sensor 30c indicates that the driver should turn the steering wheel counterclockwise as the truck is backed up. This action will turn the front wheels of the truck to the left and cause the rear of the truck to swing toward proper alignment with the trailer.

The respective sensor 30a, 30b, 30c are wired in parallel so that the corresponding tone is sanded if either of the interconnected sensors is struck by the collimated beams. The spacing between these additional sensors and the adjoining sensor is typically slightly less than the width of the beam 23 so that the beam cannot miss these sensors when it is slightly to the right of the sensor 30a or to the left of sensor 30c.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A hitch positioning apparatus comprising:
   a transceiver coupled to a towing vehicle, said transceiver including a plurality of spaced apart light emitters for generating a plurality of light beams and a light sensor for sensing reception of said light beams;
   a reflector coupled to a towed vehicle for receiving said light beams from said light emitters and reflecting said light beams to said light sensor; and
   a transmitter coupled to said light sensor for transmitting a signal to a built in vehicle radio within the towing vehicle which emits a plurality of tones indicating which portion of said light sensor receives said reflected light beams from said reflector.

2. The hitch positioning apparatus of claim 1 wherein said plurality of light emitters further comprises two light emitters laterally spaced apart relative to a longitudinal axis of said towing vehicle.

3. The hitch positioning apparatus of claim 2 wherein said light sensor further comprises three light sensors laterally spaced apart relative to a longitudinal axis of said towing vehicle such that said two light emitters are intermittently disposed between said three light sensors.

4. The hitch positioning apparatus of claim 1 wherein said light sensor further comprises three light sensors laterally spaced apart relative to a longitudinal axis of said towing vehicle.

5. The hitch positioning apparatus of claim 1 wherein said light beams further comprise infrared light beams.

6. The hitch positioning apparatus of claim 1 wherein said transceiver is mounted to a bumper of said towing vehicle.

7. The hitch positioning apparatus of claim 1 wherein said reflector is mounted to tongue of said towed vehicle.

8. The hitch positioning apparatus of claim 1 wherein said plurality of tones include a first tone sounding upon a first end of said sensor receiving said reflected light, a second tone sounding upon a second end of said sensor receiving said reflected light, and a third tone sounding upon a middle portion of said plurality of sensors receiving said reflected light.

9. The hitch positioning apparatus of claim 8 wherein said plurality of tones further includes a stop tone sounding upon said middle portion of said sensor receiving a predetermined intensity of said reflected light.

10. A hitch positioning apparatus comprising:
    a transceiver coupled to a towing vehicle, said transceiver including:
      a first light sensor for sensing received light;
      a first light emitter for emitting a first light beam adjacent but spaced apart from said first light sensor;
      a second light sensor for sensing received light adjacent but spaced apart from said first light emitter;
      a second light emitter for emitting a second light beam adjacent but spaced apart from said second light sensor;
      a third light sensor for sensing received light adjacent but spaced apart from said second light emitter;
    a reflector coupled to a towed vehicle for receiving said first and second light beams from said first and second light emitters and reflecting said first and second light beams toward at least one of said first, second, and third light sensors; and
    a transmitter coupled to said first, second, and third light sensors for transmitting a signal to a built in vehicle radio of said towing vehicle which emits one of a plurality of tones according to which of said first, second, and third light sensors receives said first and second light beams reflected from said reflector.

11. The hitch positioning apparatus of claim 10 wherein said first and second light beams further comprise infrared light beams.

12. The hitch positioning apparatus of claim 10 wherein said transceiver is mounted to one of a bumper and a hitch of said towing vehicle.

13. The hitch positioning apparatus of claim 10 wherein said reflector is mounted to a tongue of said towed vehicle.

14. The hitch positioning apparatus of claim 10 wherein said plurality of tones includes a first tone sounding upon said first light sensor receiving either of said first and second light beams from said reflector, a second tone sounding upon said second light sensor receiving either of said first and second light beams from said reflector, and a third tone sounding upon said third light sensor receiving either of said first and second light beams from said reflector.

15. The hitch positioning apparatus of claim 14 wherein said plurality of tones further includes a stop tone sounding upon said second light sensor receiving a predetermined intensity of either of said first and second light beams from said reflector.

* * * * *